Jan. 23, 1968 NOBUO FUKUDA ET AL 3,364,713
METHOD FOR CONTROLLING OPERATIONS FOR THE
COOLING OF STEEL PLATE IN ACCORDANCE WITH
FORMULAE OBTAINED BY THEORETICAL ANALYSIS
Filed Aug. 26, 1964

INVENTORS
Nobuo Fukuda
Tatsuya Kimura
Koji Wada

BY Wenderoth, Lind & Ponack

ATTORNEYS

United States Patent Office 3,364,713
Patented Jan. 23, 1968

3,364,713
METHOD FOR CONTROLLING OPERATIONS FOR THE COOLING OF STEEL PLATE IN ACCORDANCE WITH FORMULAE OBTAINED BY THEORETICAL ANALYSIS
Nobuo Fukuda and Tatsuya Kimura, Kitakyushu, and Koji Wada, Sakai, Japan, assignors to Yawata Iron & Steel Co., Ltd., Tokyo, Japan, a corporation of Japan
Filed Aug. 26, 1964, Ser. No. 392,248
Claims priority, application Japan, Aug. 27, 1963, 38/45,134
3 Claims. (Cl. 72—201)

ABSTRACT OF THE DISCLOSURE

A method for predictive control of the coiling temperature of steel strip delivered from the finishing stands of a hot strip mill, in which use is made of rolling speed, finishing temperature, strip thickness, water temperature, physical constants (specific heat, specific weight and emissivity) of rolled material, and, initial settings of spraying location and valve opening for cooling water; with these factors a coiling temperature is computed and compared with the desired coiling temperature. If the computed temperature is higher than the desired temperature, the spraying portion of the cooling apparatus is lengthened and further the valve opening is widened automatically until the temperature difference is eliminated. If the computed temperature is lower than the desired temperature, the opposite procedure is carried out.

---

This invention relates in general to a method for the cooling of steel plate in a hot strip mill, and more particularly to that for controlling operations for the cooling of steel strip (hereinafter called "strip") on the hot-run table of a hot strip mill in accordance with formulae which are obtained by theoretical analysis.

In the present hot strip steel plate market, improvement of quality and reduction of production cost are dire necessities. It is therefore an urgent necessity for strip producers to follow the trend in the world to modernize their hot strip mills by adopting automatic control systems, particularly such systems using computors. This invention is to carry out a method for controlling operations for the cooling of strip on the hot-run table in accordance with formulae which are obtained by theoretical analysis of the cooling conditions of strip, said conditions having a close relation the improvement of quality of the product, thereby developing a new use for an automatic control system using computors and also raising the accuracy of operations for the cooling of strip.

Thus this invention is to control and adjust operations for the cooling of strip in accordance with formulae which are obtained by theoretical analysis of the two varieties of the cooling process to be carried out after the rolling process, that is, the cooling by heat conduction by using a water shower and by heat radiation without using water shower.

The invention will now be described with reference to the accompanying drawings in which.

(A) *Cooling by heat conduction*

Figure 2:
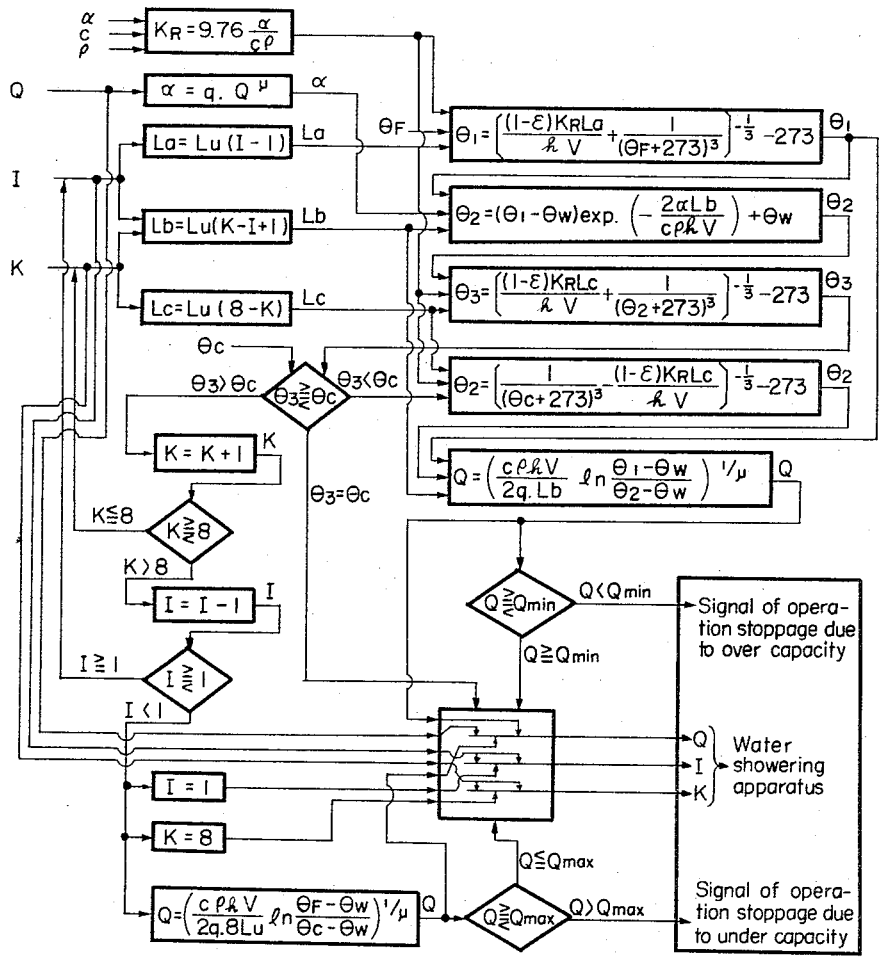
FIG. 2 is a block diagram according to which the automatic control of cooling operations is carried out on the hot-run table.

When strip is cooled by such liquids as water, heat transfer between the strip and the liquid takes place on the surface of strip, causing a drop of the temperature of strip. While the surface is quickly cooled, the cooling of the interior lags behind, and there must be the difference in temperature drop between the surface and the interior of strip. However, one may neglect such difference because of the thinness of the strip and also its good heat conductivity. (According to the theoretical calculations, the difference of temperature between the surface of the interior of strip of less than 10 mm. thick is not more than one percent, which value is negligible practically.)

In the following equations:

$\theta$ = temperature of strip (° C.)
$\theta_w$ = temperature of cooling liquid (° C.)
$\alpha$ = heat transfer coefficient between strip and cooling liquid (Kcal./m.² hr. ° C.)
$C$ = specific heat of strip (Kcal./kg. ° C.)
$\rho$ = specific weight of strip (kg./Nm.³)
$h$ = thickness of strip (m.)
$t$ = time (hr.)

The heat transmission between cooling liquid and strip can be expressed by the following differential equation:

$$2\alpha(\theta - \theta_w)dt = -Ch\rho d\theta \qquad (1)$$

Integrating Eq. 1 between $t=o$ and $t=T$, one obtains $$\theta_2 = e^{-\frac{2\alpha T}{C\rho h}}(\theta_1 - \theta_w) + \theta_w \qquad (2)$$

or rearranging in series function to obtain an approximate equation $$\theta_2 = \left(1 - \frac{2\alpha T}{C\rho h}\right)(\theta_1 - \theta_w) + \theta_w \qquad (3)$$

where $\theta_1$ is the temperature of strip before being cooled by liquid (° C.); $\theta_2$ the temperature of strip after cooling (° C.); $e$ the base of natural logarithm. If strip is to be cooled while travelling over the distance L m at the velocity V m/hr., the time required for this cooling T can be expressed by $T=L/V$.

(B) *Cooling by heat radiation*

When the temperature of strip falls due to heat radiation, the temperature drop varies according to the ratio between the temperature of the strip and that of the surroundings. Assuming the fourth power of this ratio to be constant (the inventor believes that this assumption will result in a practically negligible error, if any), the temperature drop due to cooling by heat radiation can be expressed by the following differential equation.

In this equation

Ⓣ = temperature of strip (° K.)
$\eta$ = surrounding temperature coefficient (surrounding temp./strip temp.)
$t$ = time (hr.)
$C$ = specific heat of strip (Kcal./kg. ° C.)
$\rho$ = specific weight of strip (Kcal./Nm.³)
$h$ = thickness of strip (m.)
$a$ = emissivity of strip surface
$C_s$ = Stefan-Baitzmann constant; 4.88 Kcal./m.² hr. (° K./100)⁴

$$2 \cdot C_s a (Ⓣ/100)_4 \cdot (1-\eta^4)dt = -C \cdot h \cdot \rho \cdot dⓉ \qquad (4)$$

Assuming $\eta^4$ to be constant and integrating Eq. 4 between $t=o$ and $t=T$, one obtains $$1/Ⓣ_2{}^3 = (1-\eta^4)\frac{3 \cdot K_R \cdot T}{h} + 1/Ⓣ_1{}^3 \qquad (5)$$

where Ⓣ₁ is the temperature of the strip before being cooled by radiation (° K.), Ⓣ₂ is the temperature of strip after cooled by radiation (° K.) where $$K_R = \frac{2 \cdot a \cdot C_s}{10^8 \cdot C \cdot \rho}$$

If strip is to be cooled while travelling over the distance $Lm$, the time required for this cooling $T$ can be expressed by $T=L/V$.

(C) *Application of the above two formulae*

As part of the operation of the hot strip mill, the cooling of strip which is sent from the finishing mill is carried out on the hot-run table to obtain the required coiling temperature. This cooling operation is carried out in variations according to types of cooling apparatus and grades and sizes of strip. In any case, the operation can be controlled and adjusted in accordance with varied combinations of the Formulae 2 or 3 and 5.

The following is one example of the calculation of the coiling temperature of strip which is subjected to cooling by water showering throughout the part $L_1m$ and by radiation throughout the part $L_2m$ of the hot-run table. ($L=L_1+L_2$.) The total length of hot-run table is $Lm$.)

The nomenclature for various temperatures etc.:

$\theta_F$=Temperature at the end point of the finishing roller (or at the inlet into the water showering part) (° C.)
$\theta_M$=Temperature at the outlet from the water showering part (or at the inlet into the radiation cooling part) (° C.)
$\theta_c$=Temperature at the outlet from the radiation cooling part (or coiling temperature) (° C.)

The same nomenclature as mentioned above will be used for the other symbols.

From Eq. 2, one obtains $$\theta_M = e^{-\frac{2\alpha L_1}{C\rho hV}}(\theta_F - \theta_w) + \theta_w \qquad (6)$$

From Eq. 5, one obtains $$\theta_C = \left\{(1-\eta^4)\frac{3K_R L_2}{hV} + \frac{1}{(\theta_M+273)^3}\right\}^{-1/3} - 273 \qquad (7)$$

In Eqs. 6 and 7, if the grade and size of strip are determined, $c$, $\rho$, $h$ and $K_R$ will be determined. $\theta_F$ will be given from the rolling conditions, $\alpha$ and $\theta_w$ from conditions of the apparatus; $\eta^4$ from the surrounding conditions. Using these values the Formula 6 can be solved. By applying the results obtained from this calculation to Eq. 7, the coiling temperature $\theta_c$ can be easily obtained. If both $\theta_F$ and $\theta_c$ are given in the above calculations, one has only to find the values of $L_1$ and $L_2$ which will satisfy simultaneous conditions for Eqs. 6 and 7. In case the length of the water showering part is constant and both $\theta_F$ and $\theta_c$ are given, one has only to find the value of $\alpha$ which will satisfy simultaneous conditions for Eqs. 6 and 7, and then apply this value to a process for controlling the flow rate of the water shower (or the pressure of the water shower). In other practices such as cooling by liquid in a limited part or the latter part of the hot-run table, a combination of the Formulae 2 (or 3) and 5 is applicable in variations. In case of cooling by liquid throughout the whole length of the hot-run table only the Formula 2 or 3 will meet the purpose; in case no such cooling is used on the hot-run table, only the Formula 5 will do.

*Example 1.—Comparison of values obtained by the method of this invention and those obtained from experience*

Table 1 shows the results of experiments which were conducted in accordance with the method of this invention for controlling and adjusting operations for the cooling of strip of low carbon steel under the following conditions: Stefan-Boltzmann constant $C_S=4.88$ Kcal./m.$^2$ hr. (° K./100)$^4$; constants of strip $C=0.15$ Kcal./kg. ° C., $a=0.80$ and $\rho=7.85\times10^3$ kg./m.$^3$; constant of the surrounding conditions $\eta^4=0.04$; constant of the apparatus $L=L_1+L_2=80$ m. ($L_1$ represents the length of the water cooling part and $L_2$ that of the radiation cooling part); and $\alpha$ in two levels, that is, 10 kg./cm.$^2$ and 4.5 kg./cm.$^2$ of water shower pressure. (Besides this, cooling without using a water shower was carried out.)

Figure 1:
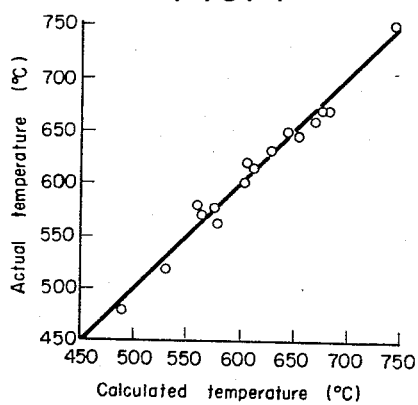
FIG. 1 illustrates the results of these operations mentioned in Table 1. It is noted that good agreement is found between actual coiling temperatures and coiling temperatures calculated from the formulae.

FIG. 1 illustrates the results of experiments mentioned in Table 1. These show that values calculated by the method of this invention agree almost exactly with those obtained from experience.

*Example 2.—Application of the method of this invention to cooling operations under the automatic control system using computers*

According to the method of this invention, a cooling operation on the hot-run table can be controlled without difficulty by using computers. One example of such operations is shown in FIG. 2. This is a block diagram illustrating operations on such a type of the hot-run table that its water showering apparatus covers the whole length of the table and is divided into eight parts.

The nomenclature for constants, parameters and measured values appearing in this block diagram—

Input:
 Constants:
  $a$=Emissivity
  $c$=Specific heat
  $\rho$=Specific weight
  $\epsilon=\eta^4$ Coefficient of surrounding temperature
  $Q_{max}$=Maximum opening of valve
  $Q_{min}$=Minimum opening of valve
  $Lu$=Length of water showering section unit
  $\theta_F$=Temperature at outlet finishing mill
  $\theta_c$=Coiling temperature
  $h$=Thickness of strip
  $I$=Water showering starting section
  $K$=Water showering ending section
  $Q$=Opening of valve
  $q$=Coefficient of valve opening
  $u$=Exponent of valve opening
 Measured values:
  $\theta_w$=Temperature of water shower
  $V$=Strip speed This block diagram is so designed that the location of the water shower can be determined so as to meet metallurgical requirements regarding cooling operations on the hot-run table thereby to reduce the temperature of strip just sent from the finishing mills to the desired coiling temperature. Therefore, it is possible to determine the location of the water shower by figuring I and K. It is also possible to determine the desired initial opening and the maximum and minimum openings of the valve. These are symbolized as $Q$, $Q_{max}$ and $Q_{min}$ in FIG. 2. The diagram is also so designed that the values of $C$, $\rho$ and $a$ can be changed according to grades of strip. The value of $h$ also can be changed according to thickness of strip. As for the speed of strip $V$, values which have already been measured (such as the speed at the last stand of the finishing mill) can be utilized.

*Example 3*

By the method of this invention, the change of the coiling temperature according to the increase of the rolling speed can be calculated without difficulty, as will be seen in the following.

Many of the up-to-date types of hot strip mills are so devised as to speed up rolling of strip after the top of strip has coiled around the coiler mandrel. This is to raise operation efficiency and improve the quality of the product.

At a certain plant, the rolling of strip of 2.3 mm. thick and 3 feet wide is carried out at the initial velocity ($V_1$) of 1700 f.p.m. and at an increased velocity of 2700 f.p.m. after the top of the strip has coiled around the coiler mandrel. Details of the water showering apparatus of the hot-run table used at that plant are not known to us. But calculation was made on the rise of the coiling temperature due to a 1000 f.p.m. increase of the rolling velocity from 1700 f.p.m., assuming 870° C. of the temperature at the outlet from the finishing mill, 600° C. for the initial coiling temperature and water shower being carried out throughout the whole length of the hot-run table, as follows:

$$600 = e^{-K_1/(2.3 \times 1700)} \cdot (870-30) + 30; \quad K_1 = 1510$$

$$\therefore \theta_2 = e^{-1510/(2.3 \times 2700)} \cdot (870-30) + 30 = 690° \text{ C.}$$

Therefore, the coiling temperature will rise by 90° C. with the above increase of the rolling speed but with the other water showering conditions remaining the same.

Determination of the location and pressure of a water shower for controlling change of the temperature occurring while and after speeding up the rolling speed, can be made without difficulty by using the Formulae 2 (or 3) and 5.

$\alpha$ = heat transfer coefficient between steel strip and cooling liquid (Kcal./m.²/hr. ° C.)
$T$ = cooling time by liquid (hr.) and equals $L/V$ in $\dfrac{\text{m.}}{\text{m./hr.}}$ 2. A method as claimed in claim 1 in which the steel strip is cooled by radiation on the remainder of the length of the hot run table according to the formula:

$$\frac{1}{\Theta_2{}^3} = (1-\eta^4)\frac{3K_R T}{h} + \frac{1}{\Theta_1{}^3}$$

wherein $\Theta_1$ = temperature of steel strip before cooled by radiation (° K.)
$\Theta_2$ = temperature of steel strip after cooled by radiation (° K.)

TABLE 1

[$\Theta_W = 30°$ C.]

| $a$ (Kcal./m.² hr. ° C.) | $h$ (mm.) | $L_1$ (m.) | $L_2$ (m.) | $V$ (f.p.m.) | $\Theta_F$ (° C.) | $\Theta_C$ (° C.) actual temperature | $\Theta_C$ (° C.) calculated temperature |
|---|---|---|---|---|---|---|---|
| 148 Water Shower Pressure 10 at | 9.0 | 50 | 30 | 660 | 890 | 650 | 645 |
| | 9.0 | 50 | 30 | 750 | 900 | 670 | 675 |
| | 9.0 | 50 | 30 | 800 | 890 | 670 | 679 |
| | 6.0 | 50 | 30 | 720 | 870 | 570 | 565 |
| | 6.0 | 50 | 30 | 750 | 870 | 575 | 573 |
| | 3.2 | 40 | 40 | 1,100 | 870 | 580 | 560 |
| | 2.8 | 40 | 40 | 1,180 | 855 | 520 | 530 |
| | 2.8 | 30 | 50 | 1,200 | 840 | 560 | 580 |
| 97 Water Shower Pressure 4.5 at | 6.0 | 60 | 20 | 700 | 855 | 600 | 603 |
| | 6.35 | 60 | 20 | 750 | 860 | 630 | 628 |
| | 6.35 | 70 | 10 | 690 | 890 | 620 | 606 |
| | 4.76 | 50 | 30 | 860 | 845 | 615 | 612 |
| | 4.0 | 40 | 40 | 960 | 870 | 640 | 654 |
| | 3.2 | 80 | 0 | 1,100 | 825 | 480 | 490 |
| No Water Showering | 2.3 | 0 | 80 | 1,600 | 865 | 750 | 745 |
| | 1.6 | 0 | 80 | 1,550 | 820 | 660 | 670 |

What we claim is:

1. A method of cooling steel strip being rolled, comprising moving the steel along the hot run table of a continuous hot strip mill for a distance L at a velocity V, and applying a shower of cooling liquid to said steel strip along at least a part of the length of said hot run table for cooling the steel from a temperature of said steel strip at the start of said part of the length to a desired lower temperature at the end of said part of said length and controlling the amount and pressure of cooling liquid applied by said shower to achieve a heat transfer coefficient between the steel strip and cooling liquid according to the formula:

$$\theta_2 = e^{\dfrac{-2\alpha T}{C\rho h}}(\theta_1 - \theta_w) + \theta_w$$

wherein $\theta_1$ = temperature of steel strip before cooled by liquid (° C.)
$\theta_2$ = temperature of steel strip after cooled by liquid (° C.)
$\theta_w$ = temperature of cooling liquid (° C.)
$e$ = base of natural logarithm
$C$ = specific heat of steel strip (Kcal./kg. ° C.)
$\rho$ = specific weight of steel strip (kg./Nm.³)
$h$ = thickness of steel strip (m.)

$\eta$ = surrounding temperature coefficient $$K_R = \frac{2aC_s}{10^8 C\rho}$$

$a$ = emissivity of steel strip surface
$T$ = cooling time by radiation (hr.)
$h$ = thickness of steel strip (m.)
$C_s$ = Stefan-Baltzmann constant; 4.88 Kcal./m.² hr. (° K./100)⁴
$C$ = specific heat of steel strip (Kcal./kg. ° C.)
$\rho$ = specific weight of steel strip (Kcal./Nm.³)

and the amount and pressure of cooling liquid being controlled to make the temperature at the end of said part of said length and the temperature at the beginning of said remainder of said length the same.

3. A method according to claim 1 wherein cooling liquid shower is applied along the entire length of the hot run table.

References Cited

UNITED STATES PATENTS 2,696,823  12/1954  Scott _____ 72—200

CHARLES W. LANHAM, *Primary Examiner.*

A. RUDERMAN, *Assistant Examiner.*